United States Patent
Gupta et al.

(10) Patent No.: US 11,915,262 B2
(45) Date of Patent: Feb. 27, 2024

(54) BUDGET CONSTRAINED DEEP Q-NETWORK FOR DYNAMIC CAMPAIGN ALLOCATION IN COMPUTATIONAL ADVERTISING

(71) Applicant: Tata Consultancy Services Limited, Mumbai (IN)

(72) Inventors: Garima Gupta, Noida (IN); Lovekesh Vig, Noida (IN); Gautam Shroff, Noida (IN); Manasi Malik, Delhi (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/812,396

(22) Filed: Jul. 13, 2022

(65) Prior Publication Data

US 2023/0072777 A1 Mar. 9, 2023

(30) Foreign Application Priority Data

Jul. 16, 2021 (IN) .............................. 202121032123

(51) Int. Cl.
 G06Q 30/0242 (2023.01)
 G06Q 30/0251 (2023.01)
 G06Q 30/0273 (2023.01)

(52) U.S. Cl.
 CPC ..... G06Q 30/0244 (2013.01); G06Q 30/0255 (2013.01); G06Q 30/0275 (2013.01)

(58) Field of Classification Search
 None
 See application file for complete search history.

(56) References Cited

U.S. PATENT DOCUMENTS

| | | | |
|---|---|---|---|
| 11,062,351 | B1 | 7/2021 | Holtan |
| 2017/0032245 | A1* | 2/2017 | Osband .................. G06N 3/045 |
| 2018/0357552 | A1* | 12/2018 | Campos .................. G06N 3/08 |
| 2019/0102676 | A1* | 4/2019 | Nazari ..................... G06N 3/08 |

(Continued)

OTHER PUBLICATIONS

Zhao et al. "Deep reinforcement learning for search, recommendation, and online advertising: a survey." SIGWEB News. 2019, Spring, Article 4 (Spring 2019), 15 pages. (Year: 2019).*

(Continued)

*Primary Examiner* — Christopher B Tokarczyk
(74) *Attorney, Agent, or Firm* — FINNEGAN, HENDERSON, FARABOW, GARRETT & DUNNER, LLP

(57) ABSTRACT

In the world of digital advertising, optimally allocating an advertisement campaign within a fixed pre-defined budget for an advertising duration aimed at maximizing number of conversions is very important for an advertiser. Embodiments of present disclosure provides a robust and easily generalizable method of optimal allocation of advertisement campaign by formulating it as a constrained Markov Decision Process (MDP) defined by agent state comprising user state and advertiser state, action space comprising a plurality of ad campaigns, state transition routine and a cumulative reward model which rewards maximum total conversions in an advertising duration. The cumulative reward model is trained in conjunction with a deep Q-network for solving the MDP to optimally allocate advertisement campaign for an advertising duration within a constrained budget.

16 Claims, 6 Drawing Sheets

(56) References Cited

U.S. PATENT DOCUMENTS

2019/0311042 A1*  10/2019  Li ....................... G06F 16/2477
2021/0241925 A1*   8/2021  Cho ........................ H04L 67/53
2022/0187847 A1*   6/2022  Cella ............... G05B 19/41885

OTHER PUBLICATIONS

Zhao, Xiangyu et al., "DEAR: Deep Reinforcement Learning for Online Advertising Impression in Recommender Systems", Machine Learning, Date: May 2021, Publisher: Arxiv, https://arxiv.org/pdf/1909.03602.pdf.
Wu, Di et al., "Budget Constrained Bidding by Model-free Reinforcement Learning in Display Advertising", Artificial Intelligence, Date: Oct. 2018, Publisher: Arxiv, https://arxiv.org/pdf/1802.08365.pdf.

* cited by examiner

BUDGET CONSTRAINED DEEP Q-NETWORK FOR DYNAMIC CAMPAIGN ALLOCATION IN COMPUTATIONAL ADVERTISING

PRIORITY CLAIM

This U.S. patent application claims priority under 35 U.S.C. § 119 to: Indian Patent Application No. 202121032123, filed on Jul. 16, 2021. The entire contents of the aforementioned application are incorporated herein by reference.

TECHNICAL FIELD

The disclosure herein generally relates to the field of reinforcement learning, and, more particularly, to budget constrained deep Q-network for dynamic campaign allocation in computational advertising.

BACKGROUND

The world of advertising has seen a radical shift from traditional modes of advertising such as radio, TV, billboards to digital channels such as websites, social media, and email. In the world of digital advertising, users visit publisher webpages, and advertisers (brands, retailers) use these sites to promote relevant advertisements (ads) to users. The advertiser decides a fixed marketing budget for an advertising duration and runs multiple campaigns for that duration. Each advertisement campaign comprises one or more advertisements which are typically aimed at a unique objective termed as a conversion which is an umbrella term for the end goal of a campaign like click of an ad, purchase of a product via an online ad, brand-awareness, or increase in advertiser's traffic.

The computation flow of a digital ad involves a user who visits a publisher's webpage and can choose to interact with ad slots that are made available to advertisers on the publisher's webpage for online promotion of relevant products. In order to display relevant ad in the ad slots, the advertiser makes a two-fold decision regarding (a) campaign selection and (b) bid-price. For efficient decision-making, advertisers utilize data logs available from the user's past online transactions and estimate conversion score for ad allocation from available campaigns. The campaign with the highest score is selected, and an ad from the selected campaign is then displayed to the user. Since marketing budget for an advertising duration is fixed by the advertiser, there is also a need to allocate campaigns under a constrained budget along with the conversion score. Thus, allocating campaigns for an advertising duration with a goal of maximizing number of conversions within a fixed or constrained budget, i.e., maximization of Return on Investment (ROI) is important.

Prior works on implementing deep learning in the domain of computational advertising focus on problems such as optimal allocation of marketing budget, computing user touchpoints and computing attribution of each touchpoint in a user sequence to conversion. While these approaches distribute marketing budget at the start of advertising duration, they do not decide on optimal campaign (ad) to allocate to the user to maximize number of conversions. Several approaches have been proposed for dynamic allocation of advertising resources, particularly for determining real time bid-price for a campaign (ad). These approaches focus on bidding problem, while allocation of advertisement campaigns dynamically with fixed budget for an advertising duration is a less researched problem. One of the work on advertisement allocation (Archak, Nikolay, Vahab S. Mirrokni, and S. Muthukrishnan. "Budget Optimization for Online Advertising Campaigns with Carryover Effects.") uses Markov models for studying user-behavior and then poses budget-constrained, advertising level allocation in a sponsored advertisement setting as a constrained Markov Decision Process (MDP). The approach uses Linear Programming for determining the optimal policy. Linear Programming requires defining objective function and constraints on decision variables as linear or quadratic functions by a subject matter expert. So, it is prone to errors and is not generalizable.

SUMMARY

Embodiments of the present disclosure present technological improvements as solutions to one or more of the above-mentioned technical problems recognized by the inventors in conventional systems. For example, in one embodiment, a method for training a budget constrained deep Q-network for dynamic campaign allocation in computational advertising is provided. The method includes receiving as input—(i) browsing history of one or more users for each of a plurality of touchpoints occurring at corresponding time-points, (ii) a pre-defined budget for an advertising duration (T), and (iii) an action space comprising one or more advertisement campaigns. The browsing history comprises an advertisement associated with a corresponding advertisement campaign from the action space, and a field set to one of '0' indicating no-conversion of the advertisement and '1' indicating conversion of the advertisement, at a corresponding touchpoint from among the plurality of touchpoints. Further the method includes performing a plurality of steps for each time-point among a plurality of time-points within each episode among a plurality of episodes to jointly train a budget constrained DQN and a cumulative reward model, the plurality of steps comprising selecting a user from among the one or more users, wherein the browsing history of the user for touchpoint corresponding to the time-point is comprised in the received input. Further, an agent state comprising an advertiser state and a user state is obtained, wherein the advertiser state comprises a budget of advertisement available at the time-point and number of conversions occurred till the time-point, and wherein the user state is derived from a pre-trained autoencoder based on the browsing history of the user for the touchpoint corresponding to the time-point. Further, conversion probability of the user is predicted by a pre-trained conversion simulator based on the user state. Next, conversion is determined using a Bernoulli distribution parameterized by the conversion probability, wherein the determined conversion is an immediate reward corresponding to the agent state. Further the cumulative reward model is trained by assigning cumulative sum of all the immediate rewards determined in the episode to all pairs of agent state and action that occur in the episode, wherein action corresponding to the agent state is determined by the DQN; storing maximum cumulative rewards across all the plurality of episodes for all the agent state-action pairs in a dictionary; storing all the agent state, action, and maximum cumulative reward tuples in a first replay buffer; and updating weights of the cumulative reward model based on a loss function which minimizes squared error between (i) maximum reward across all the plurality of episodes obtained from the first replay buffer and (ii) maximum reward predicted by the cumulative reward model for the agent state. Further, the DQN is trained for dynamic campaign allocation by determining an action from the action space based on the agent state using an epsilon greedy policy; obtaining a cumulative reward corresponding to the determined action using the cumulative reward model; determining updated agent state corresponding to the user at a successive time-point from among the plurality of time-points using a state transition routine; storing a tuple comprising agent state corresponding to the user, action, cumulative reward and updated agent state corresponding to the user in a second replay buffer; and updating weights of the DQN using Bellman rule based on a tuple sampled from the second replay buffer.

In another aspect, a system for budget constrained deep Q-network for dynamic campaign allocation in computational advertising is provided. The system includes: a memory storing instructions; one or more communication interfaces; and one or more hardware processors coupled to the memory via the one or more communication interfaces, wherein the one or more hardware processors are configured by the instructions to: receive as input—(i) browsing history of one or more users for each of a plurality of touchpoints occurring at corresponding time-points, (ii) a pre-defined budget for an advertising duration (T), and (iii) an action space comprising one or more advertisement campaigns. The browsing history comprises an advertisement associated with a corresponding advertisement campaign from the action space, and a field set to one of '0' indicating no-conversion of the advertisement and '1' indicating conversion of the advertisement, at a corresponding touchpoint from among the plurality of touchpoints. Further the one or more hardware processors are configured to perform a plurality of steps for each time-point among a plurality of time-points within each episode among a plurality of episodes to jointly train a budget constrained DQN and a cumulative reward model, the plurality of steps comprising: selecting a user from among the one or more users, wherein the browsing history of the user for touchpoint corresponding to the time-point is comprised in the received input. Further, an agent state comprising an advertiser state and a user state is obtained, wherein the advertiser state comprises a budget of advertisement available at the time-point and number of conversions occurred till the time-point, and wherein the user state is derived from a pre-trained autoencoder based on the browsing history of the user for the touchpoint corresponding to the time-point. Further, conversion probability of the user is predicted by a pre-trained conversion simulator based on the user state. Next, conversion is determined using a Bernoulli distribution parameterized by the conversion probability, wherein the determined conversion is an immediate reward corresponding to the agent state. Further the cumulative reward model is trained by assigning cumulative sum of all the immediate rewards determined in the episode to all pairs of agent state and action that occur in the episode, wherein action corresponding to the agent state is determined by the DQN; storing maximum cumulative rewards across all the plurality of episodes for all the agent state-action pairs in a dictionary; storing all the agent state, action, and maximum cumulative reward tuples in a first replay buffer; and updating weights of the cumulative reward model based on a loss function which minimizes squared error between (i) maximum reward across all the plurality of episodes obtained from the first replay buffer and (ii) maximum reward predicted by the cumulative reward model for the agent state. Further, the DQN is trained for dynamic campaign allocation by determining an action from the action space based on the agent state using an epsilon greedy policy; obtaining a cumulative reward corresponding to the determined action using the cumulative reward model; determining updated agent state corresponding to the user at a successive time-point from among the plurality of time-points using a state transition routine; storing a tuple comprising agent state corresponding to the user, action, cumulative reward and updated agent state corresponding to the user in a second replay buffer; and updating weights of the DQN using Bellman rule based on a tuple sampled from the second replay buffer.

In yet another aspect, there are provided one or more non-transitory machine-readable information storage mediums comprising one or more instructions which when executed by one or more hardware processors cause a method for training the budget constrained deep Q-network for dynamic campaign allocation in computational advertising. The method includes receiving as input—(i) browsing history of one or more users for each of a plurality of touchpoints occurring at corresponding time-points, (ii) a pre-defined budget for an advertising duration (T), and (iii) an action space comprising one or more advertisement campaigns. The browsing history comprises an advertisement associated with a corresponding advertisement campaign from the action space, and a field set to one of '0' indicating no-conversion of the advertisement and '1' indicating conversion of the advertisement, at a corresponding touchpoint from among the plurality of touchpoints. Further the method includes performing a plurality of steps for each time-point among a plurality of time-points within each episode among a plurality of episodes to jointly train a budget constrained DQN and a cumulative reward model, the plurality of steps comprising selecting a user from among the one or more users, wherein the browsing history of the user for touchpoint corresponding to the time-point is comprised in the received input. Further, an agent state comprising an advertiser state and a user state is obtained, wherein the advertiser state comprises a budget of advertisement available at the time-point and number of conversions occurred till the time-point, and wherein the user state is derived from a pre-trained autoencoder based on the browsing history of the user for the touchpoint corresponding to the time-point. Further, conversion probability of the user is predicted by a pre-trained conversion simulator based on the user state. Next, conversion is determined using a Bernoulli distribution parameterized by the conversion probability, wherein the determined conversion is an immediate reward corresponding to the agent state. Further the cumulative reward model is trained by assigning cumulative sum of all the immediate rewards determined in the episode to all pairs of agent state and action that occur in the episode, wherein action corresponding to the agent state is determined by the DQN; storing maximum cumulative rewards across all the plurality of episodes for all the agent state-action pairs in a dictionary; storing all the agent state, action, and maximum cumulative reward tuples in a first replay buffer; and updating weights of the cumulative reward model based on a loss function which minimizes squared error between (i) maximum reward across all the plurality of episodes obtained from the first replay buffer and (ii) maximum reward predicted by the cumulative reward model for the agent state. Further, the DQN is trained for dynamic campaign allocation by determining an action from the action space based on the agent state using an epsilon greedy policy; obtaining a cumulative reward corresponding to the determined action using the cumulative reward model; determining updated agent state corresponding to the user at a successive time-point from among the plurality of time-points using a state transition routine; storing a tuple comprising agent state corresponding to the user, action, cumulative reward and updated agent state corresponding to the user in a second replay buffer; and updating weights of the DQN using Bellman rule based on a tuple sampled from the second replay buffer.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
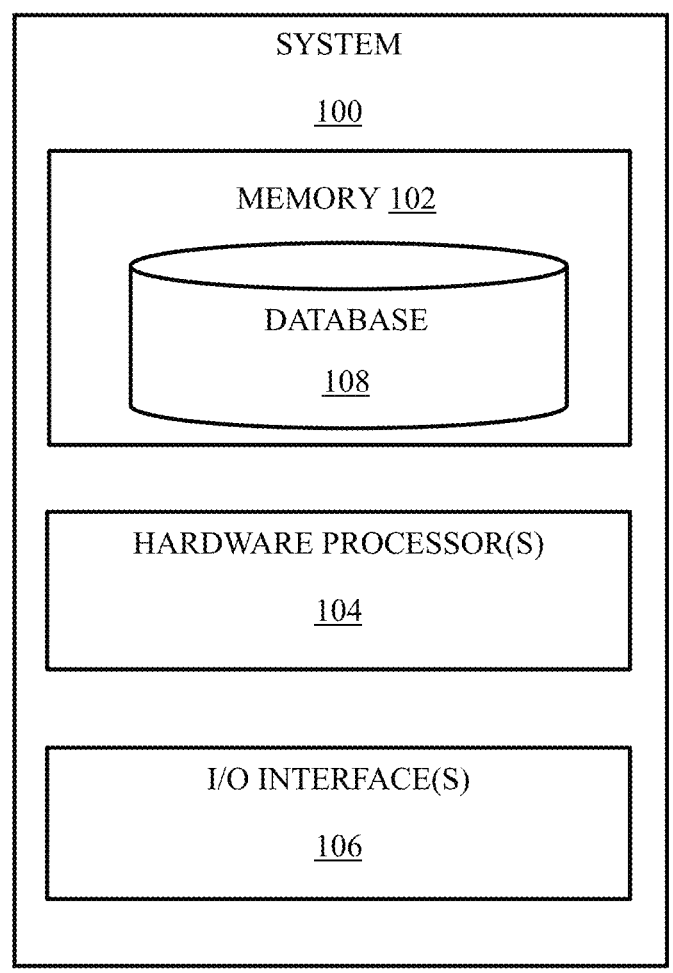
FIG. 1 illustrates an exemplary system for implementing budget constrained deep Q-network (DQN) for dynamic campaign allocation in computational advertising, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Digital advertising companies typically conduct several advertising campaigns in parallel while being constrained by a fixed overall advertising budget. This gives rise to the problem of distributing the budget across the different campaigns dynamically so as to optimize the overall ROI (or some other metric) within a specified time duration. Prior work on marketing budget allocation, distributes a fixed advertising budget across campaigns in proportion to campaign ROI (K. Ren, Y. Fang, W. Zhang, S. Liu, J. Li, Y. Zhang, Y. Yu, and J. Wang, "Learning multi-touch conversion attribution with dual-attention mechanisms for online advertising," in Proceedings of the 27th ACM International Conference on Information and Knowledge Management, 2018), (S. C. Geyik, A. Saxena, and A. Dasdan, "Multi-touch attribution based budget allocation in online advertising," in Proceedings of the Eighth International Workshop on Data Mining for Online Advertising, 2014) computed using a heuristic, rule-based approach (J. Chandler-Pepelnjak, "Measuring RoI beyond the last ad," Atlas Institute Digital Marketing Insight, 2009). In the user-ad world, a user's interaction with each ad is termed as a touchpoint, and the journey of users across sequential touchpoints can result in a conversion or non-conversion within an advertising duration. Position based approaches attribute conversion to a touchpoint based on its position in the user journey and include approaches such as last touchpoint attribution (J. Chandler-Pepelnjak, "Measuring RoI beyond the last ad," Atlas Institute Digital Marketing Insight, 2009), first touchpoint attribution, and uniform attribution to each touchpoints called equal touchpoint attribution. While these approaches are easy to deploy, they lack the ability to compute unbiased campaign ROI.

Further, data-driven approaches based on logistic regression (X. Shao and L. Li, "Data-driven multi-touch attribution models," in Proceedings of the 17th ACM SIGKDD international conference on Knowledge discovery and data mining, 2011), survival techniques (W. Ji and X. Wang, "Additional multi-touch attribution for online advertising," in Thirty-First AAAI Conference on Artificial Intelligence, 2017) are used to compute attribution of multiple touchpoints, also known as multi-touch attribution (MTA). With the advances in deep-learning, the sequential nature of user touchpoints is utilized and passed to sequential learning models like recurrent neural network (RNN), with attention mechanisms to compute attribution of each touchpoint in a user sequence to conversion (K. Ren, Y. Fang, W. Zhang, S. Liu, J. Li, Y. Zhang, Y. Yu, and J. Wang, "Learning multi-touch conversion attribution with dual-attention mechanisms for online advertising," in Proceedings of the 27th ACM International Conference on Information and Knowledge Management, 2018), (S. K. Arava, C. Dong, Z. Yan, A. Pani et al., "Deep neural net with attention for multi-channel multi-touch attribution," arXiv preprint arXiv:1809.02230, 2018). This is further improved by the use of representation learning based attribution, which handles selection bias due to personalized campaign allocation in (S. Kumar, G. Gupta, R. Prasad, A. Chatterjee, L. Vig, and G. Shroff, "Camta: Causal attention model for multi-touch attribution," in IEEE International Conference on Data Mining, 2020). Additionally, a counterfactual analysis which computes attribution as the incremental change in conversion when exposed to the campaign as compared to non-exposure to any campaign is proposed in (B. Dalessandro, C. Perlich, O. Stitelman, and F. Provost, "Causally motivated attribution for online advertising," in Proceedings of the sixth international workshop on data mining for online advertising and internet economy, 2012). While these approaches distribute marketing budget at the start of advertising duration, these do not decide on campaign (ad) to allocate to the online user.

Several approaches have been proposed for dynamic allocation of advertising resources particularly for determining real time bid-price for a campaign (ad). Approach in (Ö. Özlük, and S. Cholette, "Allocating expenditures across keywords in search advertising," Journal of Revenue and Pricing management, vol. 6, no. 4, pp. 347-356, 2007) allocate bid-price across multiple keywords in search advertising and maximizes revenue based on click rate while constraining on budget. (W. Zhang, Y. Zhang, B. Gao, Y. Yu, X. Yuan, and T.-Y. Liu, "Joint optimization of bid and budget allocation in sponsored search," in Proceedings of the 18th ACM SIGKDD international conference on Knowledge discovery and data mining, 2012) optimizes on the bid-price and allocates the advertiser's budget to multiple campaigns' bidding price in sponsored search. (H. Cai, K. Ren, W. Zhang, K. Malialis, J. Wang, Y. Yu, and D. Guo, "Real-time bidding by reinforcement learning in display advertising," in Proceedings of the Tenth ACM International Conference on Web Search and Data Mining, 2017) formulates bidding processes as an MDP and learns an optimal policy to generate bid-price using a model-based reinforcement learning (RL) approach. (D. Wu, X. Chen, X. Yang, H. Wang, Q. Tan, X. Zhang, J. Xu, and K. Gai, "Budget constrained bidding by model-free reinforcement learning in display advertising," in Proceedings of the 27th ACM International Conference on Information and Knowledge Management, 2018) proposes a model-free RL approach and uses episodic reward to scale up solutions for the budget-constrained bidding problem.

While there are many works for bidding problem, there are few works which consider allocation of campaigns or advertisement dynamically with budget fixed for an advertising duration. (N. Archak, V. Mirrokni, and S. Muthukrishnan, "Budget optimization for online advertising campaigns with carryover effects," in Sixth Ad Auctions Workshop. Citeseer, 2010) uses Markov models for studying user-behavior and then poses budget-constrained, advertising level allocation in a sponsored advertisement setting as a constrained Markov Decision Process (MDP). The approach uses Linear Programming for determining the optimal policy and is prone to errors and not generalizable.

The present disclosure provides a robust and easily generalizable method of optimal allocation of advertisement campaign within a fixed budget in an advertising duration by formulating it as a constrained Markov Decision Process (MDP) and jointly training a Deep Q-Network (DQN) and cumulative reward model for solving the constrained MDP. The MDP is defined by a tuple of four elements (s,a,s',r(s,a)) wherein s is agent state comprising user state and advertiser state, a is an action selected from an action space comprising a plurality of ad campaigns, s' is the updated agent state after performing the action and is determined by a state transition routine and r(s,a) is value of reward received when agent state is changed from s to s' on performing the action a. The reward is determined by a cumulative reward model which rewards maximum total conversions in an advertising duration as opposed to a typical RL framework which rewards immediate conversion.

Referring now to the drawings, and more particularly to FIG. 1 through 7, where similar reference characters denote corresponding features consistently throughout the figures, there are shown preferred embodiments and these embodiments are described in the context of the following exemplary system and/or method.

FIG. 1 illustrates an exemplary system for implementing budget constrained deep Q-network for dynamic campaign allocation in computational advertising, according to some embodiments of the present disclosure. In an embodiment, the system 100 includes one or more processors 104, communication interface device(s) or Input/Output (I/O) interface(s) 106, and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server. In an embodiment, the I/O interface device(s) 106 are used to display advertisement campaigns to one or more users wherein suitable advertisement campaign of an advertiser is determined by method of present disclosure.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The database 108 may store information but is not limited to, information associated with at least one of: (i) browsing history of one or more users for each of a plurality of touchpoints occurring at corresponding time-points, (ii) advertisement campaigns by an advertiser, (iii) pre-defined budget for an advertising duration, (iv) information generated during training of deep Q-network and cumulative reward model and so on. Further, the database 108 stores information pertaining to inputs fed to the system 100 and/or outputs generated by the system (e.g., at each stage), specific to the methodology described herein. Functions of the components of system 100 are explained in conjunction with diagrams depicted in FIGS. 2 through 4 for dynamic campaign allocation in computational advertising.

Figure 2:
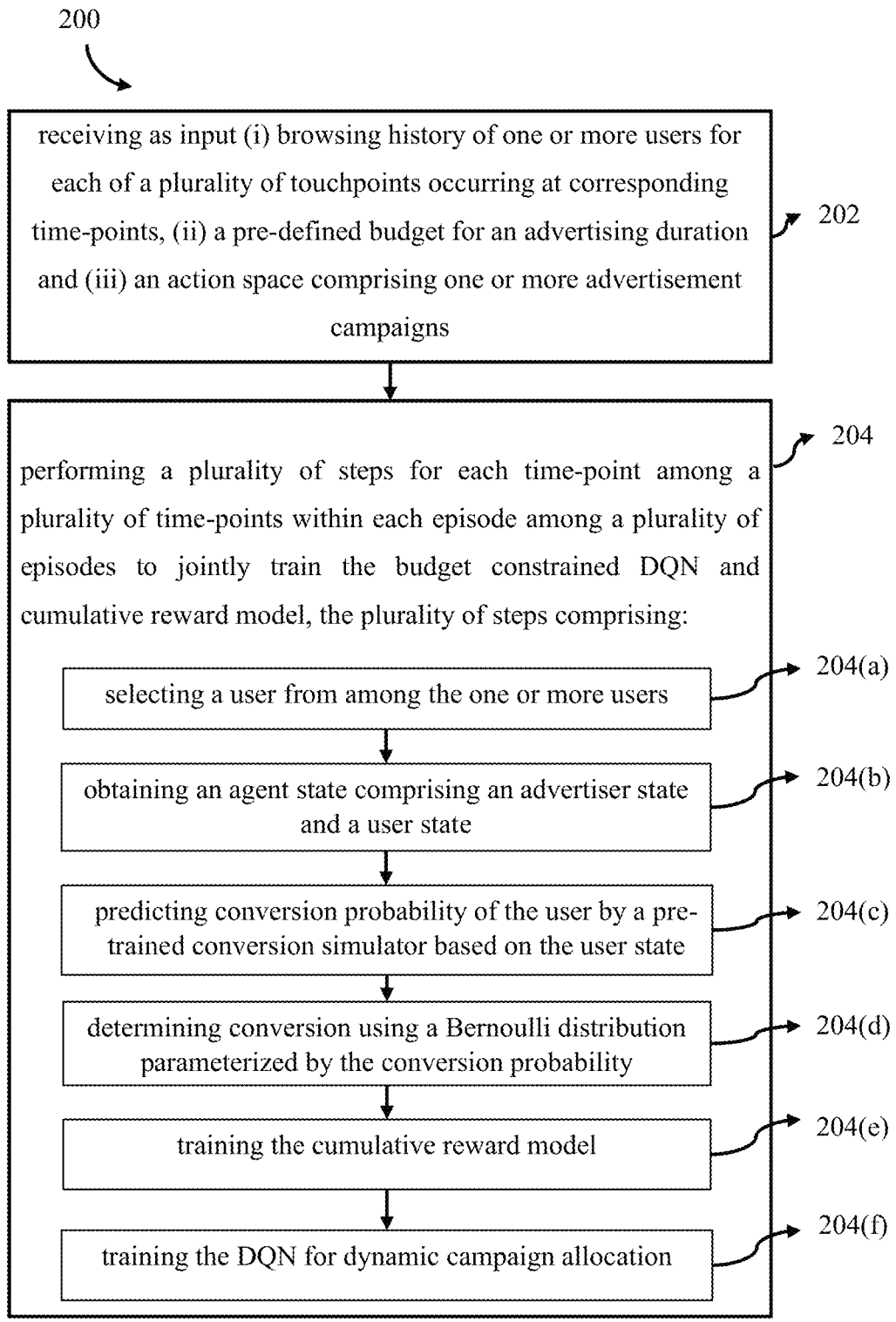
FIG. 2 is a flowchart illustrating method of training the deep Q-network for dynamic campaign allocation in computational advertising, according to some embodiments of the present disclosure.
Figure 3:
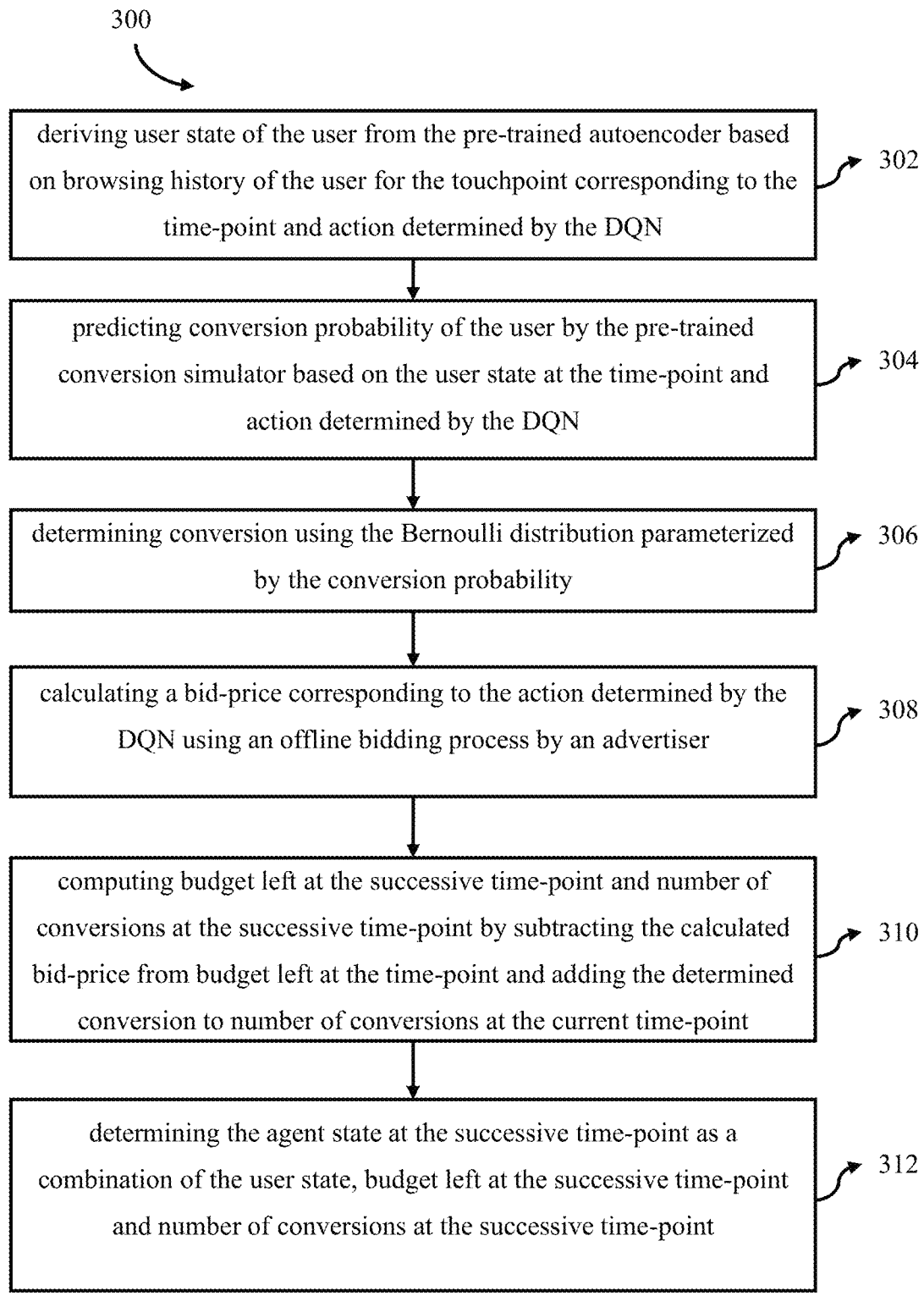
FIG. 3 is a flowchart illustrating state transition routine, according to some embodiments of the present disclosure.
Figure 4:
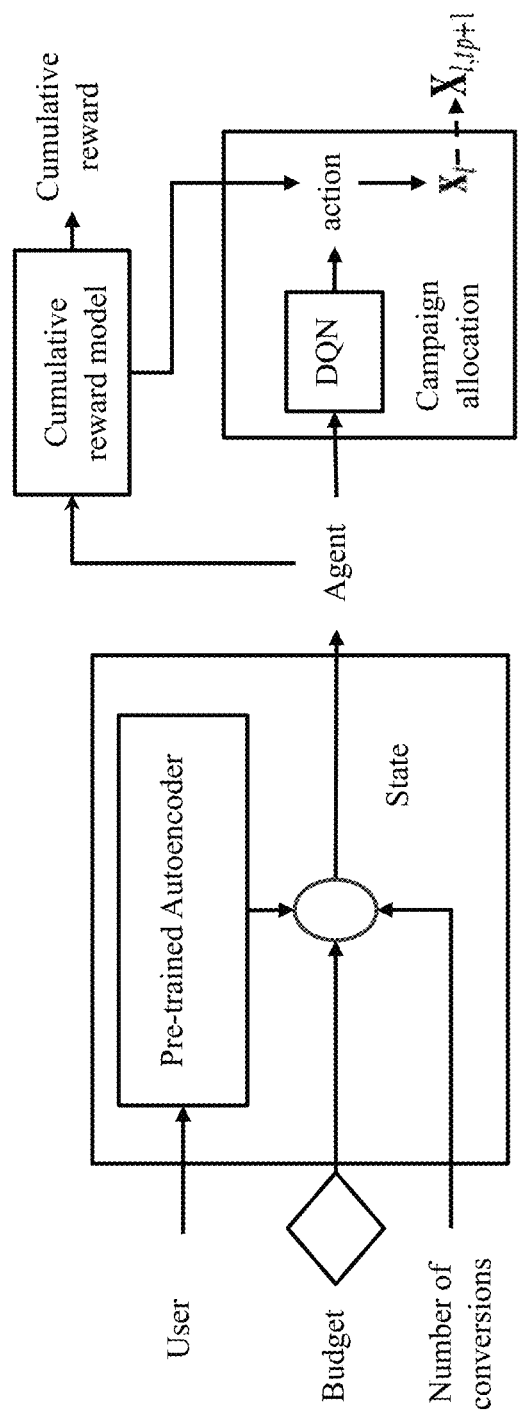
FIG. 4 is a block diagram illustrating state representation and campaign allocation using the DQN and cumulative reward model, according to some embodiments of the present disclosure.
Figure 5:
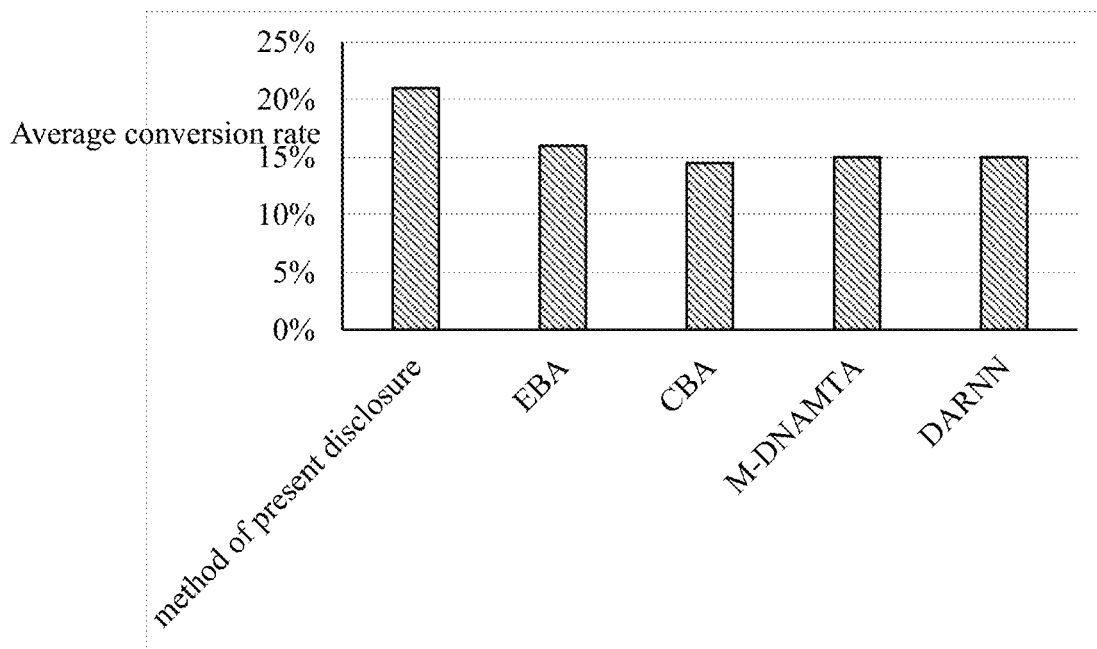
FIG. 5 illustrates comparative analysis of average conversion rate achieved by method illustrated in FIG. 2 and average conversion rates achieved by a plurality of state-of-the-art static budget allocation approaches, according to some embodiments of the present disclosure.

In an embodiment, the system 100 comprises one or more data storage devices or the memory 102 operatively coupled to the processor(s) 104 and is configured to store instructions for execution of steps of the method depicted in FIGS. 2 through 4 by the processor(s) or one or more hardware processors 104. The steps of the method of the present disclosure will now be explained with reference to the components or blocks of the system 100 as depicted in FIG. 1 and the steps of flow diagram as depicted in FIG. 2 and block diagrams of FIGS. 3 and 4. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

FIG. 2 is a flowchart illustrating method (200) of training the deep Q-network for dynamic campaign allocation in computational advertising, according to some embodiments of the present disclosure. At step 202 of the method 200, the one or more hardware processors 104 are configured to receive, as input, (i) browsing history of one or more users (u″) for each of a plurality of touchpoints (TP) occurring at corresponding time-points, (ii) a pre-defined budget for an advertising duration (T), (iii) an action space comprising one or more advertisement campaigns. The browsing history, represented as $D^I=\{u^n,\{x_{n,tp},c_{n,tp},y_{n,tp}\}_{tp=1}^{TP}\}_{n=1}^N$, comprises an advertisement ($x_{n,tp}$) associated with a corresponding advertisement campaign ($c_{n,tp}$) from the action space, and a field ($y_{n,tp}$) set to one of '0' indicating no-conversion of the advertisement and '1' indicating conversion of the advertisement, at a corresponding touchpoint from among the plurality of touchpoints. The conversion is an end goal of an advertisement campaign comprising at least one of: click of an advertisement by a user, purchase of a product via the advertisement, brand-awareness, and increase in advertiser's traffic.

At step 204 of the method 200, one or more hardware processors are configured to perform a plurality of steps for each time-point among a plurality of time-points within each episode among a plurality of episodes to jointly train a budget constrained DQN and a cumulative reward model, the plurality of steps comprising steps 204(*a*) to 204(*f*) described herein. Each of the plurality of episodes terminate if the advertising duration is passed or if the pre-defined budget gets exhausted. At step 204(*a*) of the method 200, a user (u^l) from among the one or more users is selected (or sampled), wherein the browsing history of the user for touchpoint corresponding to the time-point is comprised in the received input. Further, at step 204(*b*) of the method 200, an agent state comprising an advertiser state and a user state is obtained. The advertiser state comprises a budget $B_t$ of advertisement available at the time-point and number of conversions $Y_t$ occurred till the time-point. Thus, the advertiser state is represented as $(B_t, Y_t)$. The user state of the user (u^l) is derived from a pre-trained autoencoder using the browsing history of the user (represented as $X_{l,tp}$ wherein tp is touchpoint of user u^l at the time-point t). The pre-trained autoencoder maps the browsing history of the user to a fixed dimensional user-representation $\Phi^l$ using encoder of the pre-trained autoencoder according to equation 1. Thus, the agent state is represented by equation 2.

$$\Psi_e: X_{l,tp} \rightarrow \Phi^l \text{ where } \Phi^l \in R^{1 \times K} \tag{1}$$

$$s_t=[\Phi^l, B_t, Y_t] \tag{2}$$

In an embodiment, the pre-trained autoencoder is a recurrent autoencoder (comprising an encoder and a decoder) that was trained using a portion of the browsing history of the user with L1 norm between input user browsing history and reconstructed user sequence as the loss function given by equation 3. In an embodiment, 20-30% of user browsing history is considered as training data. As understood by a person skilled in the art, the reconstructed user sequence is generated by the decoder during training of the recurrent autoencoder.

$$L_{ae}=\|X_{l,t}-X'_{l,t}\|_1 \tag{3}$$

As understood by a person skilled in the art, L1 norm loss function or L1 loss function minimizes error which is the sum of all the absolute differences between true value (herein, user browsing history) and the predicted value (herein, reconstructed user sequence).

At step 204(*c*) of the method 200, conversion probability of the user is predicted by a pre-trained conversion simulator based on the user state. In an embodiment, the pre-trained conversion simulator is a Long Short Term Memory (LSTM) based Encoder-Decoder model with Bahdanau Attention followed by linear and SoftMax layers. It is trained by using a portion of user browsing history as training data and cross-entropy loss function given by equation 4. In an embodiment, 20-30% of user browsing history is considered as training data.

$$L_{ce}=-y_{l,tp}\log(p_{l,tp}) \tag{4}$$

In equation 4, wherein $y_{l,tp}$ is actual conversion occurred at time-point corresponding to $tp^{th}$ touchpoint and $p_{l,tp}$ is the conversion probability predicted by the pre-trained conversion simulator. As understood by a person skilled in the art, the cross-entropy loss function measures dissimilarity between actual conversion and predicted conversion probability and during the course of training the pre-trained conversion simulator, the dissimilarity is reduced. Further, at step 204(*d*) of the method 200, conversion $\hat{y}_{l,tp}$ of the user is determined using a Bernoulli distribution parameterized by the conversion probability according to equation 5.

$$\hat{y}_{l,tp} \text{Bernoulli}(p_{l,tp}) \tag{5}$$

As understood by a person skilled in the art, Bernoulli distribution is a discrete probability distribution for an experiment having only 2 possible outcomes. Conversion determined by equation 5 is a value '0' or '1' indicating no conversion of advertisement or conversion of an advertisement respectively. In an embodiment, the conversion $\hat{y}_{l,tp}$ is considered as immediate reward for the agent state and is further utilized in training a cumulative reward model as described in step 204(*e*) of the method 200.

Further, at step 204(*e*) of the method 200, a cumulative reward model ($N_R$) is trained. In an embodiment, the cumulative reward model is represented by $N_R(s,a,\theta_R)$ wherein s is agent state, a is action and $\theta_R$ is weights of the cumulative reward model. In an embodiment, the cumulative reward model employs 3 layers of Rectified Linear Unit (ReLU) multi-layer perceptron (MLP) parameterized by $\theta_R$ and is trained to reward the conversions in an episode. The training of the cumulative reward model is performed by assigning cumulative sum of all the immediate rewards determined in the episode to all pairs of agent state and action that occur in the episode, wherein action corresponding to the agent state is determined by the DQN. Further, maximum cumulative rewards across all episodes for all the agent state-action pairs are stored in a dictionary. Further, all agent state, action and maximum cumulative reward tuples are stored in a first replay buffer ($M_R$), and weights of the cumulative reward model are updated using a loss function (given by equation 6) which minimizes squared error between (i) maximum reward across all episodes obtained from the first replay buffer and (ii) maximum reward predicted using the cumulative reward model for the agent state.

$$(N_R(s,a,\theta_R)-M_R(s,a))^2 \tag{6}$$

Further, at step 204(*f*) of the method 200, the budget constrained Deep Q-network (DQN) is trained. The DQN is represented by $N_Q(s,a,\theta_Q)$ wherein s is agent state, a is action and $\theta_Q$ is weights of the DQN and employs 2 layers of Rectified Linear Unit Multi-Layer Perceptron (ReLU MLP) followed by a fully connected layer and is trained to determine optimal campaign allocation policy with a fixed budget for an advertising duration. At the step 204(*f*), the DQN is trained by determining an action from the action space based on the agent state $s_t$ using an epsilon greedy policy. As understood by a person skilled in the art, the epsilon greedy policy selects action with highest estimated reward. Further, a cumulative reward $R_t$ corresponding to the determined action is obtained using the cumulative reward model. Further, updated agent state $s_{t+1}$ corresponding to the user at a successive time-point from among the plurality of time-points is determined using a state transition routine (illustrated in FIG. 3). Further, a tuple comprising agent state $s_t$, action at, cumulative reward $R_t$, and updated agent state $s_{t+1}$ is stored in a second replay buffer $M_Q$ and weights of the DQN are updated using Bellman rule (given by equation 7) based on a tuple sampled from the second replay buffer.

$$N_Q(s,a,\theta_Q) = N_Q(s,a,\theta_Q) + \alpha(r(s,a) + \max_{a'} N_Q(s',a',\theta_Q) - N_Q(s,a,\theta_Q)) \quad (7)$$

wherein $\alpha$ is learning rate and r(s,a) is the cumulative reward.

As understood by a person skilled in the art, during training, the DQN learns optimal policy $\pi$ which determines an action for a given agent state such that maximum cumulative reward is obtained for the determined action. The trained DQN and the trained cumulative reward model resulting after the plurality of episodes is used to allocate optimal campaigns to online users during advertising duration as illustrated by FIG. 4.

FIG. 3 is a flowchart illustrating state transition routine (300), according to some embodiments of the present disclosure. The state transition routine determines an agent state at a successive time-point (t+1) from among the plurality of time-points. At step 302 of the state transition routine, user state of the user is derived from the pre-trained autoencoder based on browsing history of the user for the touchpoint corresponding to the time-point and action determined by the DQN. Further, at step 304, conversion probability of the user is predicted by the pre-trained conversion simulator based on the user state at the time-point and action determined by the DQN using the step 204(c) of the method 200. Further, at step 306, conversion $\hat{y}_{k,tp}$ is predicted based on the user state at the time-point t and action determined by the DQN using the step 204(d) of the method 200. Further, at step 308, a bid-price is determined corresponding to the action determined for the user at the current time-point using an offline bidding process by the advertiser. Further, at step 310, budget left ($B_{t+1}$) at the successive time-point t+1 and number of conversions ($\gamma_{t+1}$) at the successive time-point t+1 are computed based on budget left $B_t$ and number of conversions $Y_t$ at the time-point t respectively by subtracting the calculated bid-price from budget left at the time-point and adding the determined conversion to number of conversions at the current time-point according to equations 7 and 8. Further, at step 312, the agent state at the successive time-point t+1 is determined as combination of the user state, budget left at the successive time-point and number of conversions at the successive time-point. Thus, the agent state at the successive time-point t+1 is [$\Phi^k$, $B_{t+1}$, $Y_{t+1}$].

$$B_{t+1} = B_t - b_{k,tp} \quad (7)$$

$$Y_{t+1} = Y_t + \hat{y}_{k,tp} \quad (8)$$

FIG. 4 is a block diagram illustrating process of state representation (402) and process of campaign allocation (404), according to some embodiments of the present disclosure. The process of state representation (block 402) determines agent state at the current time-point t by: determining user state based on browsing history of the user using the pre-trained autoencoder; and concatenating the user state with advertiser state (comprising budget $B_t$ left at time t and number of conversions $Y_t$ at time t) to obtain the agent state at time t. Further, the process of campaign allocation 404 determines an optimal ad campaign to be displayed to the user at the time-point t based on the agent state by using the DQN trained by the method 200. The DQN predicts suitable action i.e. the ad campaign which achieves maximum cumulative reward for the agent state.

Experimental Setup

Dataset: an online advertising dataset by Criteo is used for the experiments. The dataset has 30 days of live traffic data, with ~16M impressions (ad displayed to the user corresponding to a particular ad campaign), 45K conversions and 675 campaigns. Each row in the dataset corresponds to an impression displayed to a user, context features, cost of impression and whether the user converted within 30 days. User sequences are obtained by grouping user identity (ID) and conversion identity (ID) given in Criteo dataset. Following which, user sequences containing more than 20 touchpoints are discarded. The pre-processed dataset contains 1,244,318 user sequences with 675 campaigns. Each unique combination of the context features are considered (9 categorical columns given as cat1, cat2, . . . , cat9) to represent a distinct ad. Each campaign has one or more ads associated with it. In addition, bid-price is provided as 'cost' along—with each impression and is scaled by a factor of 100 for experimental analysis. Campaign, cat1, cat2 . . . cat9 attributes at each touchpoint are used to train the pre-trained autoencoder and the pre-trained conversion simulator. Further reduced, pre-processed dataset is obtained by randomly selecting 10 campaigns to create a training dataset containing 310,209 impressions and 96,074 user sequences.

Evaluation metrics: Four evaluation metrics are used to evaluate method of present disclosure. The evaluation metrics include—(i) conversion rate, (ii) budget utilization, (iii) Cost Per Conversion (CPA), and (iv) Return on Investment (ROI) calculated according to equations 9-12.

$$conversionrate = \frac{conversioncountY_t}{\text{number of users}} \times 100 \quad (9)$$

$$budgetutilization = \frac{B - B_t}{B} \times 100 \text{ wherein } B \text{ is pre-} \quad (10)$$

defined fixed budget allocated for entire advertising duration $$CPA = \frac{B_T}{Y_T} \quad (11)$$

$$ROI = \frac{V(y_{n,tp})}{CPA} \quad (12)$$

Baselines: Performance of method of present disclosure is compared against following 2 baselines—(i) Random Actions (RA) wherein campaigns are randomly selected; and (ii) Historical Actions (HA) wherein campaigns are selected according to user's sequence in historical data. Essentially, the next action for a user is the next campaign/ad that occurs in the corresponding sequence in the historical dataset. In addition to the above mentioned baselines, the budget allocation using method of present disclosure is compared with attribution based budget allocation approaches. It is to be noted that method of present disclosure is dynamic budget allocation approach while attribution based approaches are static, wherein budget is distributed across campaigns at the start of advertising duration. The attribution based budget allocation approaches include: (i) Equal Budget Allocation (EBA): The total budget (B) is equally divided equally amongst all campaigns. (ii) Criteo Attribution Based Budget Allocation (CBA): The total budget is divided amongst all campaigns in proportion to attribution values assigned by Criteo's attribution model. The attribution value associated with a campaign is obtained by summing over values in the attribution column from the Criteo dataset for impressions associated with that campaign. (iii) Modified DNAMTA (M-DNAMTA): DNAMTA model (S. K. Arava, C. Dong, Z. Yan, A. Pani et al., "Deep neural net with attention for multi-channel multi-touch attribution," arXiv preprint arXiv:1809.02230, 2018) uses LSTM-hierarchical attention mechanism for touchpoint attribution. In M-DNAMTA approach, Bahdanau attention mechanism is used instead. Campaign-wise attributions are then calculated using equation 13. (iv) DARNN Attribution Based Budget Allocation (DARNN): DARNN (K. Ren, Y. Fang, W. Zhang, S. Liu, J. Li, Y. Zhang, Y. Yu, and J. Wang, "Learning multi-touch conversion attribution with dual-attention mechanisms for online advertising," in Proceedings of the 27th ACM International Conference on Information and Knowledge Management, 2018, pp. 1433-1442) model is used to get campaign-wise attribution values. For CBA, M-DNAMTA and DARNN, campaign-wise ROIs are obtained using equation 14 and the total budget B is then divided among the campaigns in proportion to these ROI's according to equation 15.

$$Attr(C_m \vee y_{n,TP}) = \sum_{tp=1}^{TP} Attr_{tp}.(c_{n,tp} = C_m) \forall \, nusersequences with TP touch - points \quad (13)$$

$$ROI_{C_m} = \frac{\sum_{\forall y_{n,TP}=1} Attr(C_m \vee y_{n,TP}) V(y_{n,TP})}{Moneysentoncampaign C_m} \quad (14)$$

where $V()$ is value of a conversion $$B_{C_m} = \frac{ROI_{C_m}}{\sum_{m=1}^{M} ROI_{C_m}} \quad \text{where } B_{C_m} \text{ is budget for campaign } C_m \quad (15)$$

Implementation specifics: The pre-defined budget B is set to 0.76, T=100, and maximum number of users is 100 for an episode. The training dataset used has 10 campaigns, and additionally 'no campaign' is used as an action, making the count of possible actions to M=11. For user state representation $\Phi^n$, K=16 is used, making the user state representation 1×18 vector. Optimal ad allocation policy is obtained by training the DQN and cumulative reward model for 1000 episodes, and then performance is evaluated using an average over 100 episodes. Training of both DQN and Cumulative Reward Model is started with $\varepsilon=1$ and this parameter is decayed with 0.8 every episode. During testing, this parameter $\varepsilon$ is kept at 0.01 throughout. The replay buffers for both DQN and Cumulative Reward Model are assigned a size of $10^5$ and, batch size and learning rate for training both networks are 16 and 0.0005, respectively. Discount factor gamma is set as 1, and the network is updated every 2 steps. The soft update parameter tau is set as $1e^{-3}$. While training of DQN, the batches sampled from the replay buffer are such that only tuples that have converted are selected. For all the baselines, the number of users and overall budget is kept the same, and the same conversion prediction model is employed during performance evaluation.

Experimental Results

A. Comparison with Campaign Allocation Policies

The method of present disclosure is compared against two baselines policies: Random Actions (RA) and Historical Actions (HA). The comparisons are performed along 4 metrics—Conversions Rate, Budget Utilization, CPA, ROI. First, all the users' touchpoint sequences are initialized. For each user, an initial sequence is randomly picked from the training dataset and length of the initial sequence is set as min {length of picked sequence in dataset, ~Poisson(2)}. This initialization is repeated for each test episode. Then, ad campaigns are allocated to the users using method of present disclosure and conversions rate, budget utilized, and CPA of each test episode are computed. Similarly, ad campaigns are allocated to the users using RA and HA policies and the results are recorded in Table 1. It is observed that method of present disclosure outperforms RA and HA across all episodes with higher average conversion rate and a lower average CPA. From Table 1, it can be inferred that budget utilization across all three policies is similar. In terms of % increase in ROI, it can be seen that method of present disclosure leads to an 80.7% and a 100.1% ROI increase in comparison to RA and HA respectively, when each conversion has unit value. These results suggest that under the same budget constraint, a policy learnt using cumulative rewards and user, advertiser's state information, leads to much better overall performance than heuristic or random campaign allocation approaches predominantly used by advertisers.

TABLE 1

| Approach | Conversion rate | Budget utilization | CPA | ROI |
|---|---|---|---|---|
| Method of present disclosure | 20.63% | 94.7% | 0.039 | 25.64 |
| RA | 9.83% | 81.6% | 0.082 | 12.195 |
| HA | 9.27% | 85.5% | 0.084 | 11.90 |

B. Comparison with Static Budget Allocation Approaches

Figure 6:
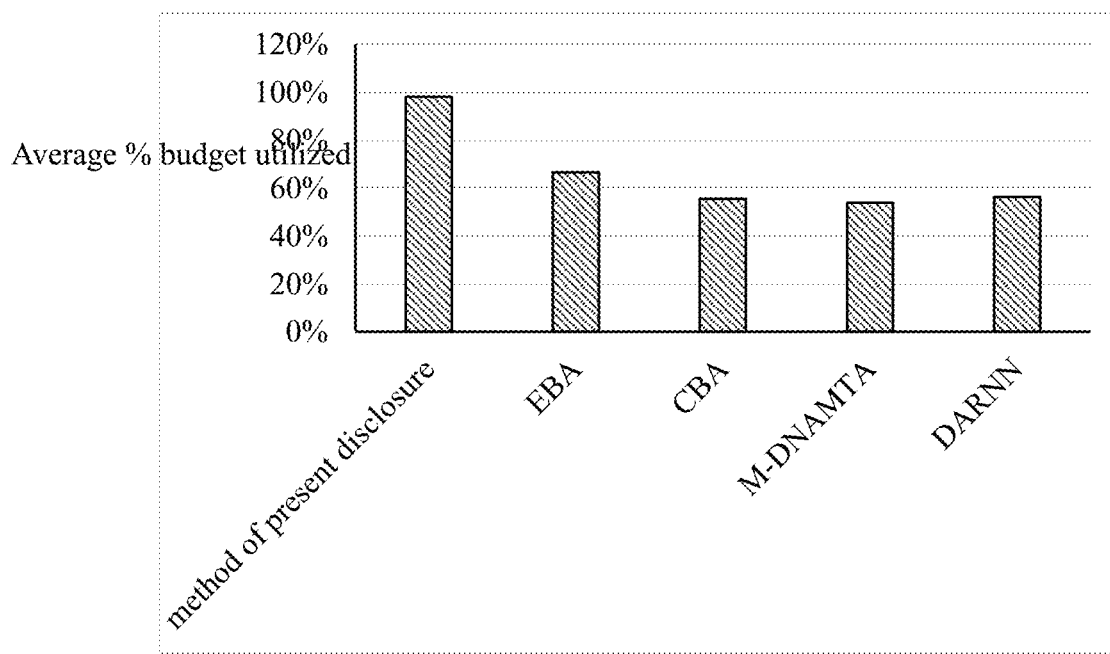
FIG. 6 illustrates comparative analysis of average budget utilization of method illustrated in FIG. 2 and average budget utilized by a plurality of state-of-the-art static budget allocation approaches, according to some embodiments of the present disclosure.
Figure 7:
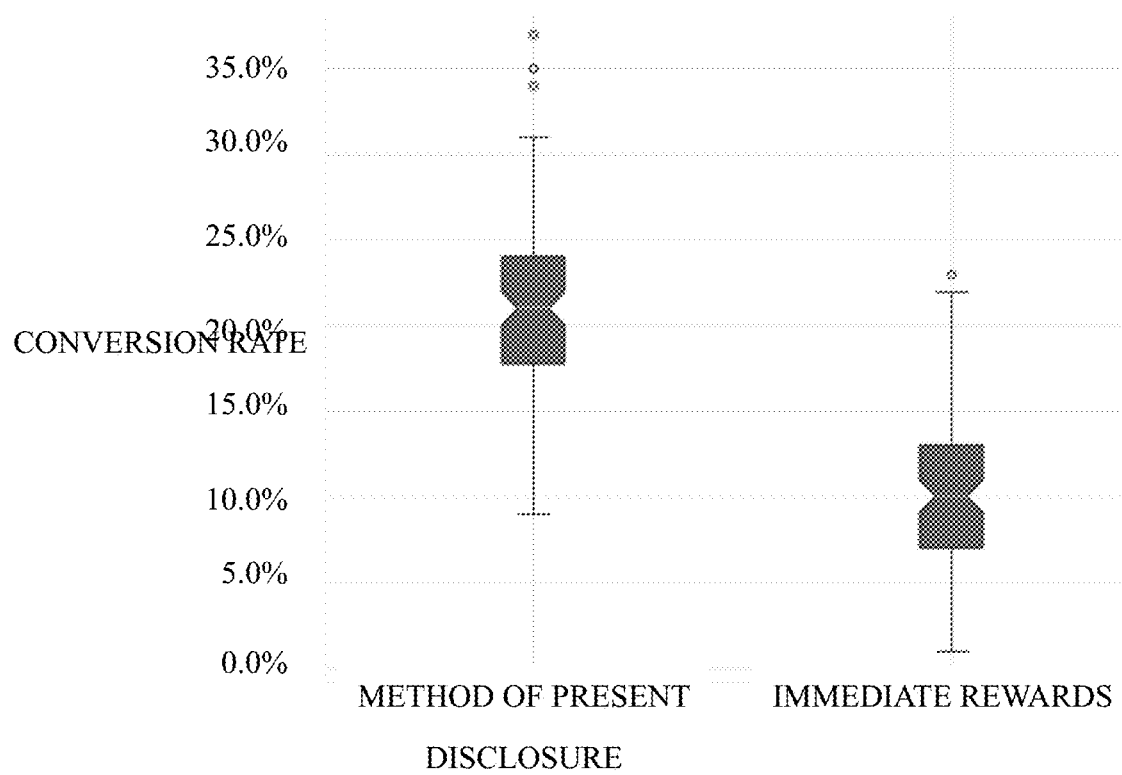
FIG. 7 illustrates comparison of conversion rate achieved by DQN learned using cumulative reward model and immediate reward.

The method of present disclosure uses a dynamic approach for budget allocation by virtue of dynamically allocating campaigns under a fixed budget constraint. Performance of this approach is compared with heuristic and attribution based static budget allocation approaches—EBA, CBA, M-DNAMTA and DARNN as described in the earlier section. Baseline approaches allocate campaign-wise budget before the start of advertising duration. During the advertising duration, if the budget for a certain campaign gets exhausted, the campaign is no longer allocated to any user. User-initialization as described previously is performed and same total budget B for all approaches is used for a fair comparison. Using campaign-wise budgets and historical actions, baseline approaches are evaluated in terms of conversion rate and budget utilized, averaged across multiple episodes. The total budget utilized in an episode for baseline approaches is computed as the difference in total budget and sum of budget remaining in all campaigns. Performance of method of present disclosure is computed using the same metrics and results are recorded in table 2 and illustrated in FIG. 5. It is observed that the method of present disclosure results in a higher average conversion rate with 21% of users converting in an episode on average whereas static budget allocation approaches—EBA, CBA, M-DNAMTA and DARNN lead to 16%, 14.5%, 15% and 15% average conversion rate respectively. It is also seen that method of present disclosure utilizes almost the entire budget while the baseline approaches utilize approximately 55% to 66% of the total budget as illustrated in FIG. 6. This likely occurs due to sub-optimal allocation of campaigns, and campaign-wise restrictions on budgets that limit the use of a campaign that otherwise may have resulted in a conversion. Method of present disclosure, on the other hand, with an overall budget constraint but no campaign-wise constraints, utilizes entire budget, leading to a higher conversion rate at the end of an episode/advertising duration. Thus it can be concluded that the additional constraint on campaigns introduced by static budget allocation approaches, lead to lower budget utilization and subsequently lesser number of conversions. Dynamic budget allocation, as introduced in present, under the same total budget, leads to better performance for an advertising duration.

TABLE 2

| Approach | Conversion rate | Budget utilization |
|---|---|---|
| Method of present disclosure | 21.00% | 98.10% |
| EBA | 16% | 67% |
| CBA | 14.50% | 55.40% |
| M-DNAMTA | 15% | 54% |
| DARNN | 15% | 56% |

C. Ablation Study of Cumulative Reward Model

The importance of using Cumulative Reward Model for learning budget effective campaign allocation policy is highlighted in this section. The performance of method of present disclosure with policy learned using immediate rewards instead of proposed Cumulative Reward Model are compared and illustrated in FIG. 7. It is observed that the median conversion rate is much higher when the policy is learned using Cumulative Reward Model than with immediate rewards. The long whiskers in the box plot are a result of different user initializations across test episodes. The policy learnt using immediate rewards focuses on learning the best policy for maximizing conversion probability for an individual user sequence. Whereas employing cumulative reward model considers the current budget and number of conversions so far and aims to find the best policy for maximizing the performance of the entire advertising duration.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of optimally allocating ad campaigns to a user by maximizing number of conversions within a fixed advertising budget and advertising duration. The embodiment thus provides a method of training a deep-Q network and a cumulative reward model for optimally allocating ad campaigns to a user.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for training a budget constrained Deep Q-network (DQN) for dynamic campaign allocation in computational advertising, the method comprising:
  receiving as input, via one or more hardware processors,
    (i) browsing history of one or more users for each of a plurality of touchpoints occurring at corresponding time-points, (ii) a pre-defined budget for an advertising duration (T), and (iii) an action space comprising one or more advertisement campaigns, wherein the browsing history comprises an advertisement associated with a corresponding advertisement campaign from the action space, and a field set to one of '0' indicating no-conversion of the advertisement and '1' indicating conversion of the advertisement, at a corresponding touchpoint from among the plurality of touchpoints;

performing, via the one or more hardware processors, a plurality of steps for each time-point among a plurality of time-points within each episode among a plurality of episodes to jointly train a budget constrained DQN and a cumulative reward model, wherein the DQN is represented by an agent state, an action corresponding to the agent state and weights of the DQN and wherein the cumulative reward model is represented by the agent state, the action corresponding to the agent state and weights of the cumulative reward model, the plurality of steps comprising:

selecting (204(a)) a user from among the one or more users, wherein the browsing history of the user for touchpoint corresponding to the time-point is comprised in the received input;

obtaining (204(b)) the agent state comprising an advertiser state and a user state, wherein the advertiser state comprises a budget of advertisement available at the time-point and number of conversions occurred till the time-point, and wherein the user state is derived from a pre-trained autoencoder based on the browsing history of the user for the touchpoint corresponding to the time-point;

predicting (204(c)) conversion probability of the user by a pre-trained conversion simulator based on the user state, wherein the pre-trained conversion simulator is a Long Short Term Memory (LSTM) based Encoder-Decoder model trained using the user state and a cross-entropy loss function;

determining (204(d)) conversion using a Bernoulli distribution parameterized by the conversion probability, wherein the determined conversion is an immediate reward corresponding to the agent state;

training (204(e)) the cumulative reward model by:
assigning cumulative sum of all the immediate rewards determined in an episode among a plurality of episodes to all pairs of agent state and the action that occur in the episode, wherein the action corresponding to the agent state is determined by the DQN;
storing maximum cumulative rewards across all the plurality of episodes for all the agent state-action pairs in a dictionary;
storing all the agent state, action, and maximum cumulative reward tuples in a first replay buffer; and
updating the weights of the cumulative reward model based on a loss function which minimizes squared error between (i) maximum reward across all the plurality of episodes obtained from the first replay buffer and (ii) maximum reward predicted by the cumulative reward model for the agent state, wherein the cumulative reward model employs three layers of Rectified Linear Unit (ReLU) multi-layer perceptron (MLP) parameterized by the weights and wherein the cumulative reward model is trained to reward the conversions;

training (204(f)) the DQN for dynamic campaign allocation by:
determining the action from the action space based on the agent state using an epsilon greedy policy;
obtaining a cumulative reward corresponding to the determined action using the cumulative reward model;
determining updated agent state corresponding to the user at a successive time-point from among the plurality of time-points using a state transition routine, wherein the state transition routine comprises:
deriving user state of the user from the pre-trained autoencoder based on browsing history of the user for the touchpoint corresponding to the time-point and action determined by the DQN;
predicting conversion probability of the user by the pre-trained conversion simulator based on the user state at the time-point and action determined by the DQN;
determining conversion using the Bernoulli distribution parameterized by the conversion probability;
calculating a bid-price corresponding to the action determined by the DQN using an offline bidding process by an advertiser;
computing budget left at the successive time-point and number of conversions at the successive time-point by subtracting the calculated bid-price from budget left at the time-point and adding the determined conversion to number of conversions at the current time-point; and
determining the agent state at the successive time-point as a combination of the user state, budget left at the successive time-point and number of conversions at the successive time-point;
storing a tuple comprising agent state corresponding to the user, action, cumulative reward, and updated agent state corresponding to the user in a second replay buffer; and
updating the weights of the DQN using Bellman rule based on a tuple sampled from the second replay buffer, wherein the DQN employs two layers of Rectified Linear Unit Multi-Layer Perceptron (ReLU MLP) followed by a fully connected layer and wherein the DQN is trained to determine an optimal campaign allocation policy with a fixed budget for the advertising duration, and wherein the trained DQN and the trained cumulative reward model resulting after the plurality of episodes are used to allocate dynamic campaigns to online users during an advertising duration.

2. The method of claim 1, wherein the conversion is an end goal of an advertisement campaign comprising at least one of: click of an advertisement by a user, purchase of a product via the advertisement, brand-awareness, and increase in advertiser's traffic.

3. The method of claim 1, wherein the pre-trained autoencoder is a recurrent autoencoder comprising an encoder and a decoder trained using a portion of the browsing history of the one or more users with $L_1$ norm between input user browsing history and reconstructed user sequence as loss function, wherein the reconstructed user sequence is generated by the decoder.

4. The method of claim 1, wherein the pre-trained conversion simulator is the Long Short Term Memory (LSTM) based Encoder-Decoder model with Bandanau Attention followed by linear and SoftMax layers and is trained by using a portion of the browsing history of the one or more users as training data and cross-entropy loss function.

5. The method of claim 1, wherein each of the plurality of episodes terminate if the advertising duration is passed or if the pre-defined budget gets exhausted.

6. The method of claim 1, wherein the weights of the cumulative reward model are updated using a loss function, wherein the loss function is represented as $$(N_R(s,a,\theta_R) - M_R(s,a))^2$$

where $N_R(s,a,\theta_R)$ is the cumulative reward model, s is the agent state, a is the action and $\theta_R$ is the weights of the cumulative reward model and $M_R$ is a first replay buffer.

7. A system for a budget constrained Deep Q-network (DQN) for dynamic campaign allocation in computational advertising, the system comprising:
a memory storing instructions;
one or more communication interfaces; and
one or more hardware processors coupled to the memory via the one or more communication interfaces, wherein the one or more hardware processors are configured by the instructions to:
receive as input—(i) browsing history of one or more users for each of a plurality of touchpoints occurring at corresponding time-points, (ii) a pre-defined budget for an advertising duration (T), and (iii) an action space comprising one or more advertisement campaigns, wherein the browsing history comprises an advertisement associated with a corresponding advertisement campaign from the action space, and a field set to one of '0' indicating no-conversion of the advertisement and '1' indicating conversion of the advertisement, at a corresponding touchpoint from among the plurality of touchpoints;
perform a plurality of steps for each time-point among a plurality of time-points within each episode among a plurality of episodes to jointly train a budget constrained DQN and a cumulative reward model, wherein the DQN is represented by an agent state, an action corresponding to the agent state and weights of the DQN and wherein the cumulative reward model is represented by the agent state, the action corresponding to the agent state and weights of the cumulative reward model, the plurality of steps comprising:
selecting a user from among the one or more users, wherein the browsing history of the user for touchpoint corresponding to the time-point is comprised in the received input;
obtaining the agent state comprising an advertiser state and a user state, wherein the advertiser state comprises a budget of advertisement available at the time-point and number of conversions occurred till the time-point, and wherein the user state is derived from a pre-trained autoencoder based on the browsing history of the user for the touchpoint corresponding to the time-point;
predicting conversion probability of the user by a pre-trained conversion simulator based on the user state, wherein the pre-trained conversion simulator is a Long Short Term Memory (LSTM) based Encoder-Decoder model trained using the user state and a cross-entropy loss function;
determining conversion using a Bernoulli distribution parameterized by the conversion probability, wherein the determined conversion is an immediate reward corresponding to the agent state;
training the cumulative reward model by:
assigning cumulative sum of all the immediate rewards determined in an episode among a plurality of episodes to all pairs of agent state and the action that occur in the episode, wherein the action corresponding to the agent state is determined by the DQN;
storing maximum cumulative rewards across all the plurality of episodes for all the agent state-action pairs in a dictionary;
storing all the agent state, action, and maximum cumulative reward tuples in a first replay buffer; and
updating the weights of the cumulative reward model based on a loss function which minimizes squared error between (i) maximum reward across all the plurality of episodes obtained from the first replay buffer and (ii) maximum reward predicted by the cumulative reward model for the agent state, wherein the cumulative reward model employs three layers of Rectified Linear Unit (ReLU) multi-layer perceptron (MLP) parameterized by the weights and wherein the cumulative reward model is trained to reward the conversions;
training the DQN for dynamic campaign allocation by:
determining the action from the action space based on the agent state using an epsilon greedy policy;
obtaining a cumulative reward corresponding to the determined action using the cumulative reward model;
determining updated agent state corresponding to the user at a successive time-point from among the plurality of time-points using a state transition routine, wherein the state transition routine comprises:
deriving user state of the user from the pre-trained autoencoder based on browsing history of the user for the touchpoint corresponding to the time-point and action determined by the DQN;
predicting conversion probability of the user by the pre-trained conversion simulator based on the user state at the time-point and action determined by the DQN;
determining conversion using the Bernoulli distribution parameterized by the conversion probability;
calculating a bid-price corresponding to the action determined by the DQN using an offline bidding process by an advertiser;
computing budget left at the successive time-point and number of conversions at the successive time-point by subtracting the calculated bid-price from budget left at the time-point and adding the determined conversion to number of conversions at the current time-point; and
determining the agent state at the successive time-point as a combination of the user state, budget left at the successive time-point and number of conversions at the successive time-point;
storing a tuple comprising agent state corresponding to the user, action, cumulative reward, and updated agent state corresponding to the user in a second replay buffer; and
updating the weights of the DQN using Bellman rule based on a tuple sampled from the second replay buffer, wherein the DQN employs two layers of Rectified Linear Unit Multi-Layer Perceptron (ReLU MLP) followed by a fully connected layer and wherein the DQN is trained to determine an optimal campaign allocation policy with a fixed budget for the advertising duration and wherein the trained DQN and the trained cumulative reward model resulting after the plurality of episodes are used to allocate dynamic campaigns to online users during an advertising duration.

8. The system of claim 7, wherein the conversion is an end goal of an advertisement campaign comprising at least one of: click of an advertisement by a user, purchase of a product via the advertisement, brand-awareness, and increase in advertiser's traffic.

9. The system of claim 7, wherein the pre-trained autoencoder is a recurrent autoencoder comprising an encoder and a decoder trained using a portion of the browsing history of the one or more users with $L_1$ norm between input user browsing history and reconstructed user sequence as loss function, wherein the reconstructed user sequence is generated by the decoder.

10. The system of claim 7, wherein the pre-trained conversion simulator is the Long Short Term Memory (LSTM) based Encoder-Decoder model with Bandanau Attention followed by linear and SoftMax layers and is trained by using a portion of the browsing history of the one or more users as training data and cross-entropy loss function.

11. The system of claim 7, wherein each of the plurality of episodes terminate if the advertising duration is passed or if the pre-defined budget gets exhausted.

12. One or more non-transitory machine-readable information storage mediums comprising one or more instructions which when executed by one or more hardware processors cause:
receiving, as input, (i) browsing history of one or more users for each of a plurality of touchpoints occurring at corresponding time-points, (ii) a pre-defined budget for an advertising duration (T), and (iii) an action space comprising one or more advertisement campaigns, wherein the browsing history comprises an advertisement associated with a corresponding advertisement campaign from the action space, and a field set to one of '0' indicating no-conversion of the advertisement and '1' indicating conversion of the advertisement, at a corresponding touchpoint from among the plurality of touchpoints;
performing a plurality of steps for each time-point among a plurality of time-points within each episode among a plurality of episodes to jointly train a budget constrained DQN and a cumulative reward model, wherein the DQN is represented by an agent state, an action corresponding to the agent state and weights of the DQN and wherein the cumulative reward model is represented by the agent state, the action corresponding to the agent state and weights of the cumulative reward model, the plurality of steps comprising:
selecting a user from among the one or more users, wherein the browsing history of the user for touchpoint corresponding to the time-point is comprised in the received input;
obtaining the agent state comprising an advertiser state and a user state, wherein the advertiser state comprises a budget of advertisement available at the time-point and number of conversions occurred till the time-point, and wherein the user state is derived from a pre-trained autoencoder based on the browsing history of the user for the touchpoint corresponding to the time-point;
predicting conversion probability of the user by a pre-trained conversion simulator based on the user state, wherein the pre-trained conversion simulator is a Long Short Term Memory (LSTM) based Encoder-Decoder model trained using the user state and a cross-entropy loss function;
determining conversion using a Bernoulli distribution parameterized by the conversion probability, wherein the determined conversion is an immediate reward corresponding to the agent state;
training the cumulative reward model by:
assigning cumulative sum of all the immediate rewards determined in an episode among a plurality of episodes to all pairs of agent state and the action that occur in the episode, wherein the action corresponding to the agent state is determined by the DQN;
storing maximum cumulative rewards across all the plurality of episodes for all the agent state-action pairs in a dictionary;
storing all the agent state, action, and maximum cumulative reward tuples in a first replay buffer; and
updating the weights of the cumulative reward model based on a loss function which minimizes squared error between (i) maximum reward across all the plurality of episodes obtained from the first replay buffer and (ii) maximum reward predicted by the cumulative reward model for the agent state, wherein the cumulative reward model employs three layers of Rectified Linear Unit (ReLU) multi-layer perceptron (MLP) parameterized by the weights and wherein the cumulative reward model is trained to reward the conversions;
training the DQN for dynamic campaign allocation by:
determining the action from the action space based on the agent state using an epsilon greedy policy;
obtaining a cumulative reward corresponding to the determined action using the cumulative reward model;
determining updated agent state corresponding to the user at a successive time-point from among the plurality of time-points using a state transition routine, wherein the state transition routine comprises:
deriving user state of the user from the pre-trained autoencoder based on browsing history of the user for the touchpoint corresponding to the time-point and action determined by the DQN;
predicting conversion probability of the user by the pre-trained conversion simulator based on the user state at the time-point and action determined by the DQN;
determining conversion using the Bernoulli distribution parameterized by the conversion probability;
calculating a bid-price corresponding to the action determined by the DQN using an offline bidding process by an advertiser;
computing budget left at the successive time-point and number of conversions at the successive time-point by subtracting the calculated bid-price from budget left at the time-point and adding the determined conversion to number of conversions at the current time-point; and determining the agent state at the successive time-point as a combination of the user state, budget left at the successive time-point and number of conversions at the successive time-point;

storing a tuple comprising agent state corresponding to the user, action, cumulative reward, and updated agent state corresponding to the user in a second replay buffer; and updating the weights of the DQN using Bellman rule based on a tuple sampled from the second replay buffer, wherein the DQN employs two layers of Rectified Linear Unit Multi-Layer Perceptron (ReLU MLP) followed by a fully connected layer and wherein the DQN is trained to determine an optimal campaign allocation policy with a fixed budget for the advertising duration and wherein the trained DQN and the trained cumulative reward model resulting after the plurality of episodes are used to allocate dynamic campaigns to online users during an advertising duration.

13. The one or more non-transitory machine-readable information storage mediums of claim 12, wherein the conversion is an end goal of an advertisement campaign comprising at least one of: click of an advertisement by a user, purchase of a product via the advertisement, brand-awareness, and increase in advertiser's traffic.

14. The one or more non-transitory machine-readable information storage mediums of claim 12, wherein the pre-trained autoencoder is a recurrent autoencoder comprising an encoder and a decoder trained using a portion of the browsing history of the one or more users with $L_1$ norm between input user browsing history and reconstructed user sequence as loss function, wherein the reconstructed user sequence is generated by the decoder.

15. The one or more non-transitory machine-readable information storage mediums of claim 12, wherein the pre-trained conversion simulator is the Long Short Term Memory (LSTM) based Encoder-Decoder model with Bandanau Attention followed by linear and SoftMax layers and is trained by using a portion of the browsing history of the one or more users as training data and cross-entropy loss function.

16. The one or more non-transitory machine-readable information storage mediums of claim 12, wherein each of the plurality of episodes terminate if the advertising duration is passed or if the pre-defined budget gets exhausted.

* * * * *